No. 768,883. PATENTED AUG. 30, 1904.
P. N. NELSON.
POWER TRANSMISSION DEVICE.
APPLICATION FILED MAY 10, 1904.
NO MODEL.
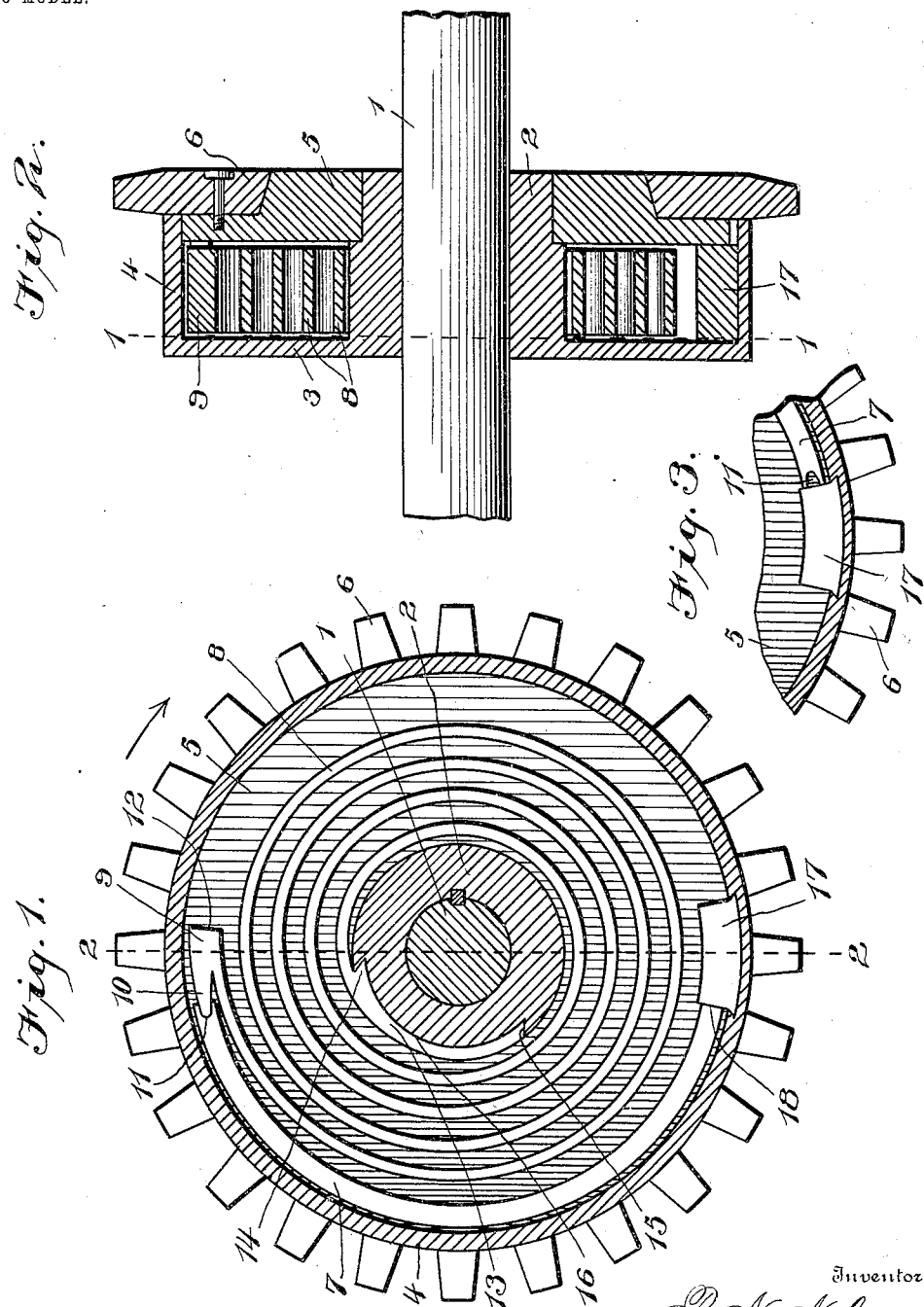

No. 768,883. Patented August 30, 1904.

UNITED STATES PATENT OFFICE.

PETER N. NELSON, OF GALESVILLE, WISCONSIN.

POWER-TRANSMISSION DEVICE.

SPECIFICATION forming part of Letters Patent No. 768,883, dated August 30, 1904.

Application filed May 10, 1904. Serial No. 207,270. (No model.)

*To all whom it may concern:*

Be it known that I, PETER N. NELSON, a citizen of the United States, residing at Galesville, in the county of Trempealeau and State of Wisconsin, have invented certain new and useful Improvements in Power-Transmission Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to driving-gear particularly adapted to be used on motor-vehicles, and is a device for the transmission of power through a compensating spring, which, however, can be applied to any power-driven machine; and my invention has for its object to transmit power to the moving parts of a machine through the agency of a compensating spring in order to avoid all shock or jerk from the sudden application of power to said moving parts.

With this object in view my invention consists in the novel construction of the several parts of my device, as will be first fully described and afterward specifically pointed out in the appended claims.

Referring to the accompanying drawings, Figure 1 is a vertical sectional view taken on line 1 1 of Fig. 2. Fig. 2 is a vertical transverse sectional view taken on line 2 2 of Fig. 1, and Fig. 3 is a fragmentary view of the bottom portion as shown in Fig. 1.

Like numerals of reference indicate the same parts throughout the several figures, in which—

1 indicates the shaft which is to be driven, and 2 indicates the collet, which is secured permanently to said shaft 1 by a key or by any suitable fastening means. By referring to Fig. 2 it will be seen that the said collet 2 is in the form of a disk having the rear plate 3 and the annular flange 4, which are formed by hollowing out or recessing the said collet, as shown in Fig. 2. 5 indicates a disk which sets within said collet and which carries a sprocket 6, rigidly connected to said disk 5. The said disk is provided, as shown in Fig. 1, with a rim or flange 7, extending within the collet 2 and close to the annular flange thereof. The said rim or flange 7 is substantially semicircular in side elevation and, as clearly shown in Fig. 1, is not annular for purposes which will be hereinafter fully described.

8 indicates a heavy coil-spring, the end 9 thereof being particularly heavy and provided with a projection 10, which enters the groove 11 in the rim or flange 7 of the disk 5, the extreme end of said spring being flattened, as shown at 12. The inner end 13 of said spring is also enlarged and is provided with what might be termed a "spur" 14, the extreme end of said spring being backwardly beveled, as shown at 15. The collet 2 is cut away or provided with a groove 16 to receive the end 13 of the spring 8, as clearly shown in Fig. 1.

17 indicates a stop, which is preferably dovetailed in the flange 4 of the collet 2.

Having thus described the several parts of my invention, its operation is as follows, supposing that power was applied by means of a suitable sprocket-chain to the sprocket 6, so as to revolve said sprocket in the direction of the arrow. (Shown in Fig. 1.) The normal tendency of the spring 8 holds the end 18 of the rim or flange 7 in contact with the stop 17, as shown in Fig. 1, when no power is being applied to the sprocket 6. Consequently when power is applied to the sprocket 6, said sprocket 6 being securely attached to the disk 5, carrying the rim or flange 7, the collet tends to revolve with the said sprocket 6. The spring 8, however, being connected to said rim or flange 7, as described, the tendency of said rim or flange to revolve is resisted by the tendency of the spring 8 to revolve said rim or flange 7 in the opposite direction. As soon as the power transmitted to the rim or flange 7 overcomes the pressure of the spring 8 said rim or flange 7, together with the sprocket 6 and disk 5, start to revolve, which means a winding of the spring 8. As soon, however, as the spring 8 commences to wind the end 13 of said spring tends to follow the movement of the end 9 of said spring, and therefore exerts a tendency to revolve the collet 2, to which the end 13 of the spring is secured. It is therefore seen that should power be suddenly applied to the sprocket 6 the rim or flange 7 would be given a sudden impulse, which impulse would shock or jerk the shaft 1 were said rim or flange 7 or sprocket 6 directly connected to said shaft 1; but in my construction the sudden impulse given the rim or flange 7 acts directly on the end 9 of the spring 8, and instead of giving a shock or jerk to the shaft 1 the sudden application of power merely tends in the first place to wind the spring 8. However, as the inner end 13 of said spring 8 tends to follow the movement of the end 9 a gradually-increasing and resilient impulse is given the collet 2, which is connected to the shaft 1, so that said collet and shaft start to revolve gradually instead of suddenly, as would be the case were the sprocket 6 directly connected to the shaft 1, thereby obviating any shock or jerk arising from the sudden application of power.

While I am aware that compensating springs have been used similarly before, I wish to lay particular stress upon the following construction: The stop 17, arranged as shown in Fig. 1, and the form of the outer end 9 of the spring 8, which operates as follows: Should the power required to turn the shaft 1 be greater than the extension strain of the spring 8, it is obvious that ordinarily the said spring 8 would wind as far as possible and then break upon the application of additional power. In my construction, however, should the power required to turn the shaft 1 be greater than the extension strain of the spring 8 said spring will be wound until the face 12 of the end 9 is in contact with the stop 17. The power thus transmitted through the stop 17 amounts to the difference between the entire power and that transmitted through the spring. On the other hand, should the sprocket be thrown in the direction of the arrow in Fig. 1, which would wind the spring 8 either partially or until the end thereof was in contact with the stop 17, and should the power be suddenly reversed the rim or flange 7 of the disk 5 would be revolved in the contrary direction until the end 18 of said rim or flange 7 came in contact with the stop 17, as shown in Fig. 1. When as soon as the said end 18 of the rim or flange 7 comes in contact with the stop 17, the connection between the sprocket 6 and the shaft 1 is direct and power tending to revolve the sprocket 6 is directly applied to the shaft 1 by reason of the stop 17.

A feature of my invention which is of considerable importance is the fact that an accidental break of the compensating spring will have no effect upon the transmission of power to the shaft 1, for, as is shown in Fig. 3, the end of the rim or flange 7, which engages the end 9 of the spring 8, is shown in contact with the stop 17. Supposing, therefore, that by reason of a flaw or otherwise the spring 8 was accidentally broken, the application of power to the sprocket 6 would revolve the rim or flange 7 until the end thereof came in contact with the stop 17, which would transmit the motion of said rim or flange to the stop 17, and therefore turn the shaft 1. It is of course obvious that the compensating feature of the device would in this instance be destroyed, and the sudden application of power would shock the mechanism the same as though the sprocket 6 were directly secured to the shaft 1; but it must be remembered that the machine would not be disabled on account of an accidental breaking of the spring, and the same could be run as well as though the sprocket were directly secured on the shaft 1 until opportunity presented itself to install a new compensating spring.

Having thus described the several parts of my invention and set forth the operation and advantages thereof, it is obvious that this power-transmission device can be applied to many and varied machines, such as automobiles, and it is also obvious that my device can be used in mills or wherever power is transmitted by belting and shafting, it being of course understood that the substitution of a belt or bevel-gearing for a sprocket-chain would immediately suggest itself wherever the application of a belt or bevel-gearing would be preferable. I furthermore do not wish to be understood as limiting myself to the exact construction as herein set forth, as various slight changes may be made therein which would fall within the limit and scope of my invention, and I consider myself clearly entitled to all such changes and modifications.

What I claim as my invention, and desire to secure by Letters Patent of the United States, is—

1. In a power-transmission device, the combination with a shaft of a collet secured thereon, said collet being hollowed out and provided with an annular flange thereon, a disk associated with said collet, a substantially semicircular rim or flange thereon, a sprocket secured to said disk, a coil-spring located within said hollow collet having its outer end enlarged and in engagement with said rim or flange on said disk, the inner end of said spring being enlarged and connected to said collet, and a stop secured to the annular flange of said collet adapted to be engaged by the said enlarged outer end of said spring, and also by the said rim or flange of said disk, substantially as described and for the purposes set forth.

2. In a power-transmission device, the combination with a shaft, of a collet secured thereon, a disk associated with said collet, a sprocket-wheel carried on said disk, a substantially semicircular rim or flange on said disk and a coil-spring having an outer enlarged end in engagement with said rim or flange and an inner enlarged end connected to said collet and a stop on said collet adapted to be engaged by the said outer enlarged end of said spring and also by the said rim or flange on said disk, substantially as described.

3. In a power transmission device, the combination with a shaft of a collet secured thereon, a sprocket associated with said collet, a rim or flange associated with said sprocket and adapted to be moved thereby, a coil-spring having its outer end in engagement with said rim or flange, and its inner end in engagement with said collet, and a stop on said collet adapted to limit the movement of said rim or flange in both directions, substantially as described.

4. In a power-transmission device, the combination with a shaft of a collet secured thereon, a sprocket-wheel associated with said collet, a rim or flange associated with said sprocket and adapted to be moved thereby, a coil-spring having an enlarged outer end in engagement with said rim or flange and its inner end connected to said collet and a stop secured to said collet adapted to limit the movement of said rim or flange in both directions, substantially as described.

5. In a power-transmission device, the combination of a collet and a sprocket associated therewith, a rim or flange associated with said sprocket and adapted to be moved thereby, a coil-spring having an enlarged outer end and provided with a projection adapted to engage said rim or flange, the inner end of said spring being enlarged and provided with a spur and adapted to engage said collet, a stop secured to said collet to receive the said enlarged outer end of said spring to limit the movement of said rim or flange in one direction and adapted to receive the said rim or flange to limit the movement thereof in the reverse direction, substantially as described.

In testimony whereof I affix my signature in presence of two witnesses.

PETER N. NELSON.

Witnesses:
   NELS PEDERSEN,
   W. S. WADLEIGH.